United States Patent [19]

Hager et al.

[11] 4,367,331

[45] Jan. 4, 1983

[54] METHOD OF DEGASSING OF AQUEOUS PVC DISPERSIONS

[75] Inventors: Claus Hager, Julbach; Rudolf Wiedholz, Burghausen, both of Fed. Rep. of Germany

[73] Assignee: Wacker-Chemie GmbH, Munich, Fed. Rep. of Germany

[21] Appl. No.: 1,527

[22] Filed: Jan. 8, 1979

[30] Foreign Application Priority Data

Jul. 27, 1978 [DE] Fed. Rep. of Germany ....... 2832972

[51] Int. Cl.$^3$ ................................................ C08F 6/16
[52] U.S. Cl. ................................. 528/501; 422/131; 526/344.2
[58] Field of Search ........................................ 528/501

[56] References Cited

U.S. PATENT DOCUMENTS

| | | | |
|---|---|---|---|
| 3,678,021 | 7/1972 | Chatelain | 528/501 X |
| 4,015,064 | 3/1977 | Feldman | 528/491 |
| 4,029,619 | 6/1977 | Tajima | 526/74 X |
| 4,031,056 | 6/1977 | Patel | 528/501 X |
| 4,092,471 | 5/1978 | Arai | 528/502 |

FOREIGN PATENT DOCUMENTS 2429777  1/1976  Fed. Rep. of Germany ...... 528/501

OTHER PUBLICATIONS

Derwent Abst., Shinetsu, J51047—080, Apr., 1976.
Derwent Abst., Shinetsu, J5113049, Nov., 1976.
Derwent Abst., Mitsubishi, J52083408, Jul., 1977.

*Primary Examiner*—C. A. Henderson

*Attorney, Agent, or Firm*—Hammond & Littell, Weissenberger and Muserlian

[57] ABSTRACT

In the process for reducing the residual vinyl chloride monomer in an aqueous polyvinylchloride dispersion comprising the steps of depressurizing an aqueous polyvinylchloride dispersion containing emulsifiers and/or protective colloids as obtained from pressure polymerization in a polymerization zone, subjecting the same to a vacuum with heating, passing the gasses and foam of liquid constituents resulting from said depressurizing step and said vacuum treating step to a confined space wherein said gasses are separated from liquid constituents, and recovering an aqueous polyvinylchloride dispersion having a reduced residual vinyl chloride monomer content, the improvement consisting in passing said gasses and foam of liquid constituents to a confined space having a volume of not more than $33\frac{1}{3}\%$ of the volume of said polyvinylchloride dispersion and returning said foam of liquid constituents to said polyvinylchloride dispersion in said polymerization zone through an elongated zone of small cross-section below said confined space and at such a rate that said confined space is never completely filled with said foam of liquid constituents. According to the invention, the amount of liquid or foam accumulating in the confined space is pumped back into the degassing (polymerization) autoclave by means of a pump arranged underneath the confined space. The advantages consist in a better utilization of the separating capacity, a better and more uniform degassing of the product, and shorter degassing cycles.

5 Claims, 1 Drawing Figure

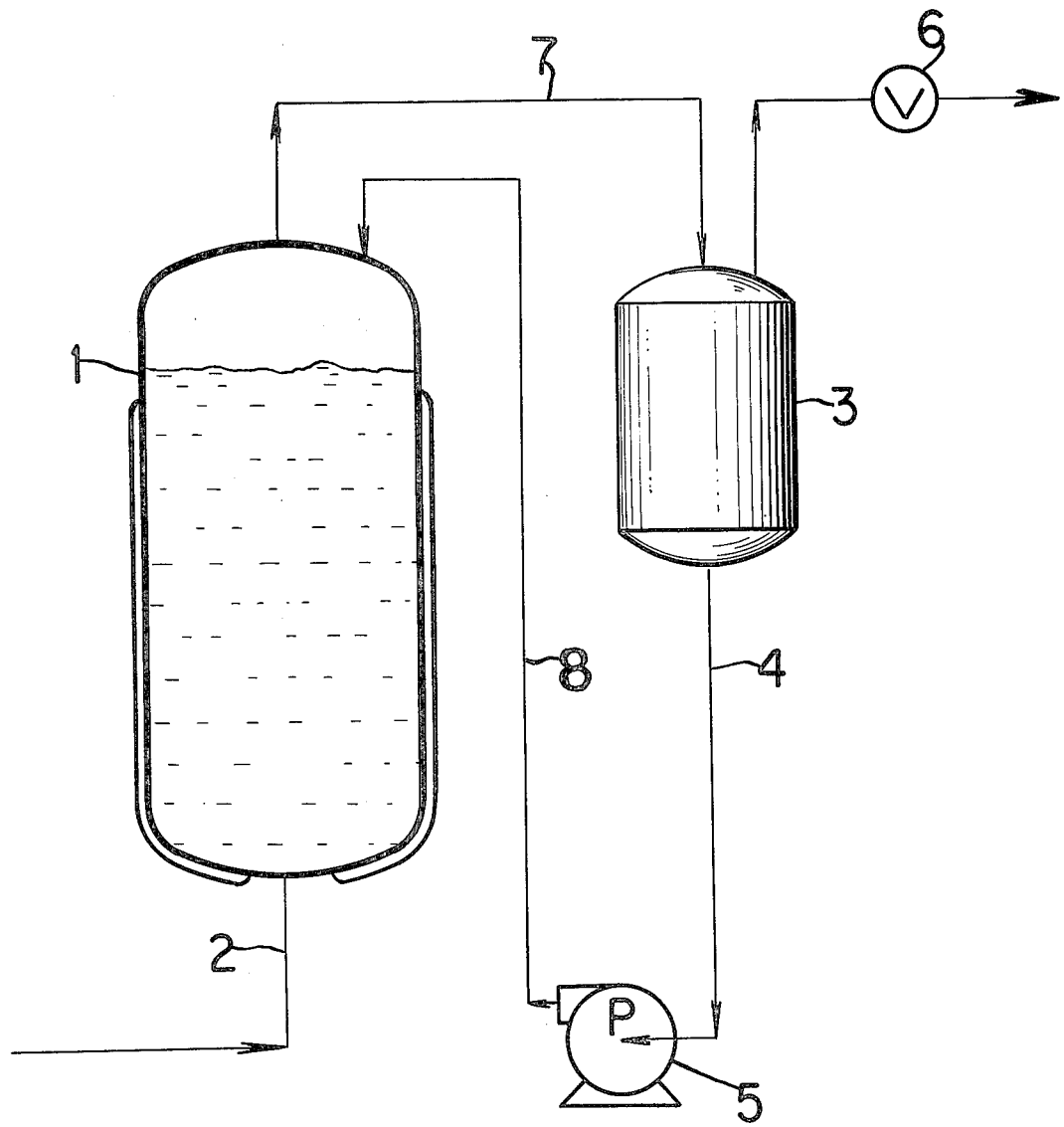

METHOD OF DEGASSING OF AQUEOUS PVC DISPERSIONS

BACKGROUND OF THE INVENTION

In the degassing of polyvinylchloride polymer/water mixtures in polymerization autoclaves it is unavoidable, with strongly foaming products, that foam will pass into the following separator. With big polymerization autoclaves, several separators, whose total volume can attain that of the autoclave, are usually arranged behind the autoclave.

The foam, which passes over both in degassing accompanied by the release of the pressure (pressure degassing) and in residual degassing with vacuum (heating by direct injection of steam or jacket heating) is retained in these separators. This efflux is in turn degassed in the separator after the residual degassing in the autoclave is completed by direct injection of steam or jacket heating. Since the efflux is a mixture of various thermally stressed polyvinylchloride polymerisates the efflux retained in residual degassing is again exposed to the high degassing temperature. This leads to a further reduction of the thermostability of the polyvinylchloride polymerisates.

If, for this reason, a lower degassing temperature or a shorter degassing time is selected for the degassing of the efflux in the separators so as not to reduce the thermostability of the product, this results in substantially higher residual vinyl chloride concentrations, which can be 50 times higher than the residual vinyl chloride concentrations of the polymerisate obtained in the autoclave. Another phenomenon in the degassing system is that the volume separated in the separator, and thus the efficiency decreases proportionally to the increasing volume of efflux. This makes another separator necessary which is connected in series or in parallel to the first one. With strongly foaming polyvinylchloride polymerisate/water mixtures it can even happen that the degassing must be stopped to degas the separators and to empty them. This leads to a substantial extension of the total cycle time.

In order to reduce or control the foam buildup in the autoclave and in the resulting efflux, the degassing rate is usually throttled corresponding to the respective requirements.

OBJECTS OF THE INVENTION

An object of the method according to the invention was to retain the efflux completely in a separation tank with an at least constant degassing rate, and to effect the degassing without impairing the thermal stability of the polymer.

Another object of the present invention is the development of an improvement in the process for reducing the residual vinyl chloride monomer in an aqueous polyvinylchloride dispersion comprising the steps of depressurizing an aqueous polyvinylchloride dispersion containing emulsifiers and/or protective colloids as obtained from pressure polymerization, in a polymerization zone, subjecting the same to a vacuum with heating, passing the gasses and foam of liquid constituents resulting from said depressurizing step and said vacuum treating step to a confined space wherein said gasses are separated from liquid constituents, and recovering an aqueous polyvinylchloride dispersion having a reduced residual vinyl chloride monomer content, the said improvement consisting in passing said gasses and foam of liquid constituents to a confined space having a volume of not more than $33\frac{1}{3}\%$ of the volume of said polyvinylchloride dispersion and returning said foam of liquid constituents to said polyvinylchloride dispersion in said polymerization zone through an elongated zone of small cross-section below said confined space and such a rate that said confined space is never completely filled with said foam of liquid constituents.

These and other objects of the invention will become more apparent as the description thereof proceeds.

THE DRAWING

The FIGURE depicts a schematic representation of the process according to the invention.

DESCRIPTION OF THE INVENTION

The subject of the invention is a method for the pressure degassing and residual degassing of polyvinylchloride polymerisate/water mixtures containing emulsifiers and/or protective colloids, following the polymerization process in the polymerization autoclave with a maximum degree of separation of the efflux (foam of liquid constituents) in a following separator, characterized in that the efflux in the separator is withdrawn continuously or intermittently from the bottom part of the separator through a standpipe connected with the separator and is pumped back into the polymerization autoclave for residual degassing by means of a pump arranged underneath the separator and connected with the standpipe.

More particularly, the present invention relates to an improvement in the process for reducing the residual vinyl chloride monomer in an aqueous polyvinylchloride dispersion comprising the steps of depressurizing an aqueous polyvinylchloride dispersion containing emulsifiers and/or protective colloids as obtained from pressure polymerization in a polymerization zone subjecting the same to a vacuum with heating, passing the gasses and foam of liquid constituents resulting from said depressurizing step and said vacuum treating step to a confined space wherein said gasses are separated from liquid constituents, and recovering an aqueous polyvinylchloride dispersion having a reduced residual vinyl chloride monomer content, the said improvement consisting in passing said gasses and foam of liquid constituents to a confined space having a volume of not more than $33\frac{1}{3}\%$ of the volume of said polyvinylchloride dispersion and returning said foam of liquid constituents to said polyvinylchloride dispersion in said polymerization zone through an elongated zone of small cross-section below said confined spaced and at such a rate that said confined space is never completely filled with said foam of liquid constituents.

The method is of particular advantage when there is a difference in height of 2 to 20 m between the separator (confined space) and the pump arranged underneath.

The method according to the invention allows a substantial reduction of the separator volume as compared to conventional separators. It has been found that the separator volume can be $\frac{1}{3}$ or less, i.e. $33\frac{1}{3}\%$ to 10% of the volume of the polyvinylchloride dispersion being degassed in the polymerization autoclave.

With a greatly foaming dispersion it is thus possible to considerably accelerate the degassing so that the polymer is subjected to less thermal stress, and lower residual vinyl chloride contents are obtained in the polymer than it was possible with conventional methods. Despite the faster degassing of the polymer dispersion with a substantially constant filling level in the autoclave, the amount of foam in the separator does not increase, compared to conventional methods. In case antifoam agents must be added in the separator to the efflux, the total polymer is laden with less antifoam agent, compared to conventional methods since the added antifoam agent is circulated between the separator and the distillation autoclave.

The FIGURE shows a schematic representation of the process according to the invention.

After the polymerization is completed, the pressure in polymerization autoclave 1 is reduced from the monomer pressure in the autoclave to normal pressure. The gasses and foam of liquid constituents is passed through line 7 to a separator 3 which has a volume of from $33\frac{1}{3}\%$ to 10%, preferably from 20% to $12\frac{1}{2}\%$, of the volume of the autoclave 1. The degassing rate is kept constant by means of a regulating valve 6 arranged in the outlet of the separator 3. In general, degassing rates of 1000 to 2500 Nm3/h are observed. The PVC-polymer dispersion foams in the autoclave 1, which is not full, and the foam is driven over into the separator 3. The separator 3 is necessary so that foam or liquid cannot get into the gasometer or be sucked into the vacuum plant during the following vacuum phase. The foam can be destroyed in the separator either mechanically or by the addition of antifoam agents.

The efflux or foam of liquid constituents is returned through a standpipe 4 by means of a pump 5 to the autoclave 1 for further degassing by means of line 8. The standpipe 4 is an elongated zone of from 2 to 20 m of small cross-section. The cross-section of the standpipe is from about 5 cm2 to 200 cm2. The same procedure is also advisable if polymer is to be liberated of adhering monomers by injecting steam through line 2 into the autoclave or degassing vessel 1. This is usually done following pressure release after polymerization in the autoclave 1.

Due to the method according to the invention of returning the efflux from the separator into the degassing vessel, essentially the separator volume remains available for the overflow from the degassing step over the entire degassing period. It is not necessary to stop the degassing due to saturation of the separator volume with foam. Furthermore, the degassing can be effected much faster, since the greater amount of efflux, compared to the hitherto possible slow degassing, is pumped back into the autoclave so that a negative influence on the degree of separation is not possible.

The amounts of foam obtained in the degassing process depend naturally on the composition of the PVC containing dispersions, particularly on the content of emulsifier and protective colloid. The polyvinylchloride/water mixtures containing emulsifiers and/or protective colloids are to be understood to be dispersions of vinyl chloride homopolymers or copolymers. The content of vinyl chloride monomer units in the copolymer is principally not subject to any quantitative limitation. Usually, however the polymerisate contains from 20% to 100%, preferably from 50% to 100% of vinylchloride monomer units. The emulsifier content of the polyvinylchloride polymerizate/water mixtures is generally from 0.001% to 5% by weight, the protective colloid content can vary between 0.001% and 10.0% by weight, both based on the polymerizate content. With strongly foaming dispersions, emulsions or suspensions, an amount corresponding to $\frac{1}{4}$ to $\frac{1}{2}$ the dispersion volume in the autoclave can be driven over into the separator until a sufficiently low monomer concentration is achieved in the dispersion.

The withdrawal of the foam or dispersion driven over from the bottom part of the separator through a standpipe connected with the pump where the pump is arranged 2 to 20 m below the separator has the advantage that, due to the hydrostatic pressure, any foam contained in the standpipe or in the pump can be compressed and is thus easier to pump. This makes it possible to do away with special pumps.

The amount of foam accumulated in the pump can naturally also be influenced in this method by other measures of foam destruction. These include both mechanical foam destruction and foam destruction by chemical antifoam agents. The amount of antifoam agent used can be reduced by returning the efflux from the separator into the degassing vessel. This type of degassing can also be used in a technically effective manner with smaller autoclaves, when several of them are connected in parallel to a common separator.

The following examples are illustrative of the practice of the invention without being limitative in any respect.

EXAMPLE 1

Polymerization of a readily foaming PVC-type to a reaction degree of about 85% was conducted in an 80 m3 autoclave. Thereafter the pressure was released from 8.5 bar$_{abs.}$ to 1 bar$_{abs}$ through a 12 m3 separator into the residual vinyl chloride recovering plant. The degassing rate was kept constant through a regulating valve arranged in the outlet of the separator, depending on the pressure after the regulating valve, and could thus be selected at random. Preferably the pressure degassing was effected at about 1000 to 2500 Nm3/h. In this case the degassing rate was about 1000 Nm3/hour.

The PVC-suspension foamed in the autoclave, whose filling level was about 80% to 85%, and that foam was driven over into the separator.

This first, higher foam yield (about 10 to 15 m3/h) in the pressure degassing, as well as the second or foam from residual degassing, which appears during the heating by injection of steam and simultaneous jacket heating at about 75° to 80° C. was retained in the separator and sucked off continuously by a pump situated about 3 m below the separator and connected thereto by a standpipe of 15 cm2 cross-section, which returns the sludge or the suspension into the autoclave. The output was about 10 to 25 m3/h. The foam obtained at the beginning of the 20 minute strip phase at a rate of about 5 to 10 m3/h was likewise returned into the autoclave. With progressive vinylchloride depletion, the foaming diminished so that no foam passed over anymore into the separator at the end of the strip phase, during which a vacuum was constantly applied.

With the end of stripping and the start of cooling, the separator was washed out by a fixed nozzle ring. The 200 to 400 liters of wash liquor were pumped back into the autoclave together with the PVC rinsed off from the separator wall.

After cooling the autoclave by means of the jacket, the latter, without breaking the vacuum, was emptied by a pump arranged under the autoclave (delivery about 200 m3/h) and was cleaned in the same way as the separator.

The concentration of the residual monomer in the dispersion was 80 ppm. No thermal damage and no increased formation of specks was observed.

EXAMPLE 2

A strongly foaming PVC-suspension was degassed in the same autoclave and under the same circumstances as described in Example 1. Differing from Example 1, however, a mechanical foam destroyer, nominal output 10 kW, was secured on the 12 m³ separator.

The distilled foam cannot be completely returned to the autoclave by the pump, due to the greater stability and the resulting longer disintegration time of the foam as well as the briefly appearing greater amounts of foam during the pressure distillation so that the entire separator was filled and the foam surrounded the foam-destroying turbine.

The foam was destroyed by the turbine and retained in the separator. The degassing rate is on the average about 1800 Nm³/h. During pressure degassing, the output was throttled for about 3 minutes to about 1000 Nm³/h. This throttling was effected in dependence on the input of the foam destroyer.

The distilled amount of foam was on the average 15 to 25 m³/h measured as a suspension. Peaks of about 30 m³/h occurred.

The degassing was effected as decribed in Example 1. The concentration of the residual monomer was 84 ppm, and no thermal damage was found in the PVC particles.

The preceding specific embodiments are illustrative of the practice of the invention. It is to be understood however, that other expedients known to those skilled in the art or disclosed herein, may be employed without departing from the spirit of the invention or the scope of the appended claims.

We claim:

1. In the process for reducing the residual vinyl chloride monomer in an aqueous polyvinylchloride dispersion comprising the steps of depressurizing an aqueous polyvinylchloride dispersion of from 20% to 100% of vinyl chloride units containing emulsifiers and/or protective colloids as obtained from pressure polymerization, in a polymerization zone, subjecting the same to a vacuum with heating, passing the gasses and foam of liquid constituents resulting from said depressurizing step and said vacuum treating step to a confined space wherein said gasses are separated from liquid constituents, and recovering an aqueous polyvinylchloride dispersion having a reduced residual vinyl chloride monomer content, the improvement consisting in passing said gasses and foam of liquid constituents through a first passageway to a confined space having a volume of not more than $33\frac{1}{3}\%$ of the volume of said polyvinylchloride dispersion and returning said foam of liquid constituents under pressure to said polyvinyl chloride dispersion in said polymerization zone through an elongated zone of small cross-section below said confined space separate from said first passageway and at such a rate that said confined space is never completely filled with said foam of liquid constituents.

2. The method of claim 1 wherein said elongated zone of small cross-section is from 2 to 20 m.

3. The process of claim 1 wherein said aqueous polyvinylchloride dispersion has from 50% to 100% of vinyl chloride units.

4. The process of claim 1 wherein emulsifiers and/or protective colloids are present in amounts of from 0.001% to 5% by weight of the dispersion and 0.001% to 10% by weight of the dispersion, respectively.

5. In the process for reducing the residual vinyl chloride monomer in an aqueous polyvinylchloride dispersion comprising the steps of depressurizing an aqueous polyvinylchloride dispersion containing emulsifiers and/or protective colloids in amounts of from 0.001% to 5% by weight of the dispersion and 0.001% to 10% by weight of the dispersion, respectively, said polyvinylchloride containing from 50% to 100% of vinyl chloride units, as obtained from pressure polymerization, in a polymerization zone, subjecting the same to a vacuum with heating, passing the gasses and foam of liquid constituents resulting from said depressurizing step and said vacuum treating step to a confined space wherein said gasses are separated from liquid constituents, and recovering an aqueous polyvinylchloride dispersion having a reduced residual vinyl chloride monomer content, the improvement consisting in passing said gasses and foam of liquid constituents through a first passageway to a confined space having a volume of not more than $33\frac{1}{3}\%$ of the volume of said polyvinylchloride dispersion and returning said foam of liquid constituents under pressure to said polyvinyl chloride dispersion in said polymerization zone through an elongated zone of from 2 to 20 m of small cross-section below said confined space by pumping through a second passageway separate from said first passageway at such a rate that said confined space is never completely filled with said foam of liquid constituents.

* * * * *